United States Patent
Peggau et al.

(10) Patent No.: US 8,933,164 B2
(45) Date of Patent: Jan. 13, 2015

(54) DISPERSION AND METHOD FOR MODIFYING A SURFACE WITH HYDROPHOBIZED SILICA

(75) Inventors: Jörg Peggau, Essen (DE); Harald Jakob, Hasselroth (DE); Wolfgang Lortz, Wächtersbach (DE)

(73) Assignee: Evonik Degussa GmbH, Essen (DE)

( * ) Notice: Subject to any disclaimer, the term of this patent is extended or adjusted under 35 U.S.C. 154(b) by 170 days.

(21) Appl. No.: 13/383,942

(22) PCT Filed: Mar. 16, 2010

(86) PCT No.: PCT/EP2010/053355
§ 371 (c)(1),
(2), (4) Date: Jan. 13, 2012

(87) PCT Pub. No.: WO2011/006684
PCT Pub. Date: Jan. 20, 2011

(65) Prior Publication Data
US 2012/0114865 A1    May 10, 2012

(30) Foreign Application Priority Data
Jul. 16, 2009 (EP) .................................. 09165647

(51) Int. Cl.
| | | |
|---|---|---|
| *C09D 133/02* | (2006.01) | |
| *C08K 5/05* | (2006.01) | |
| *C08K 5/16* | (2006.01) | |
| *C08K 5/34* | (2006.01) | |
| *C08K 5/544* | (2006.01) | |
| *C08K 5/5445* | (2006.01) | |
| *C08K 3/36* | (2006.01) | |
| *C09D 1/02* | (2006.01) | |
| *B82Y 30/00* | (2011.01) | |
| *C09C 1/30* | (2006.01) | |
| *C09D 5/16* | (2006.01) | |
| *C09D 7/12* | (2006.01) | |
| *C08K 9/06* | (2006.01) | |

(52) U.S. Cl.
CPC . *C09D 1/02* (2013.01); *B82Y 30/00* (2013.01); *C09C 1/3081* (2013.01); *C09D 5/1618* (2013.01); *C09D 7/1225* (2013.01); *C09D 7/1266* (2013.01); *C09D 7/1275* (2013.01); *C01P 2004/62* (2013.01); *C01P 2004/64* (2013.01); *C01P 2006/22* (2013.01); *C08K 3/36* (2013.01); *C08K 9/06* (2013.01); *Y10S 977/773* (2013.01)
USPC ........... 524/556; 524/188; 524/261; 524/379; 524/492; 524/493; 524/501; 524/588; 524/765; 524/789; 524/730; 106/490; 106/287.11; 106/482; 106/287.34; 106/446; 106/454; 106/491; 523/209; 523/212; 523/216; 977/773

(58) Field of Classification Search
USPC ......... 524/188, 379, 261, 492, 493, 501, 502, 524/556, 588, 730, 789, 767, 765; 977/773; 106/490, 287.11, 482, 287.34, 446, 106/491; 523/209, 212, 216
See application file for complete search history.

(56) References Cited

U.S. PATENT DOCUMENTS

| | | | |
|---|---|---|---|
| 6,022,404 A | 2/2000 | Ettlinger et al. | |
| 6,165,258 A | 12/2000 | Asada | |
| 7,056,449 B2 * | 6/2006 | Hoefler ....................... | 252/8.57 |
| 7,083,828 B2 | 8/2006 | Muller et al. | |
| 7,186,440 B2 | 3/2007 | Yoshitake et al. | |
| 7,531,598 B2 | 5/2009 | Muller et al. | |
| 7,645,335 B2 * | 1/2010 | Lortz et al. .................... | 106/488 |
| 7,828,889 B2 * | 11/2010 | Russell et al. ........... | 106/287.11 |
| 7,901,731 B2 | 3/2011 | Russell et al. | |
| 7,938,902 B2 | 5/2011 | Steingrover et al. | |
| 8,034,173 B2 | 10/2011 | Dietz et al. | |
| 8,043,654 B2 | 10/2011 | Russell et al. | |
| 8,110,037 B2 | 2/2012 | Russell et al. | |
| 2004/0097600 A1 * | 5/2004 | Greenwood et al. ............ | 516/86 |
| 2005/0192395 A1 | 9/2005 | Panz et al. | |
| 2007/0003701 A1 | 1/2007 | Yoshitake et al. | |
| 2008/0146715 A1 * | 6/2008 | Yuan et al. ..................... | 524/425 |
| 2008/0216709 A1 | 9/2008 | Steingrover et al. | |
| 2012/0171419 A1 | 7/2012 | Russell et al. | |

FOREIGN PATENT DOCUMENTS

| | | |
|---|---|---|
| EP | 0 722 992 A1 | 7/1996 |
| EP | 1 475 426 A1 | 10/2004 |
| EP | 1 741 672 A1 | 1/2007 |
| EP | 1 894 888 A1 | 8/2007 |
| WO | WO 2005/063369 A1 | 7/2005 |
| WO | WO 2005/104851 A1 | 11/2005 |
| WO | WO 2007/053266 A1 | 5/2007 |

OTHER PUBLICATIONS

English language translation of the International Search Report for PCT/EP2010/053355 filed Mar. 16, 2010.
Written Opinion of the International Searching Authority for PCT/EP2010/053355 filed Mar. 16, 2010.
English language translation of the International Preliminary Report on Patentability for PCT/EP2010/053355 filed Mar. 16, 2010.

* cited by examiner

*Primary Examiner* — Satya Sastri
(74) *Attorney, Agent, or Firm* — Law Office of: Michael A. Sanzo, LLC

(57) ABSTRACT

A dispersion, comprising 0.1 to 25% by weight hydrophobized silica, 8 to 90 wt % of at least one alcohol selected from the group consisting of ethanol, 1-propanol and 2-propanol, 7 to 89 wt % of water, 0 to 30% by weight solvent immiscible with water, and 0.04 to 5 wt % of at least one carboxyvinyl polymer present in neutralized form, can be applied to a surface using a non-drip application method and, by modifying the surface with hydrophobized silica, imparts water-repelling and self-cleaning properties to the surface.

19 Claims, No Drawings

DISPERSION AND METHOD FOR MODIFYING A SURFACE WITH HYDROPHOBIZED SILICA

CROSS REFERENCE TO RELATED APPLICATIONS

The present application is US national stage of international application, PCT/EP2010/053355 which had an international filing date of Mar. 16, 2010, and which was published in German under PCT Article 21(2) on Jan. 20, 2010. Priority is claimed to European application EP 09165647.0, filed on Jul. 16, 2009.

The invention relates to dispersions which can be used to modify surfaces with hydrophobized silica, so that they obtain water-repellent and optionally also self-cleaning properties, and also to a process for modifying a surface with hydrophobized silica without producing dust or aerosols.

The expression Lotus effect has been known for quite some time, and refers to surfaces which are hydrophobic and which have a surface structure which provides only small points of contact for water droplets and dirt particles resting on it, and which have water-repellent and self-cleaning properties. The expression "self-cleaning" here denotes surfaces from which dirt particles are removed by water droplets rolling across, without the action of surfactants. Methods which can be used to modify surfaces subsequently in such a way that they obtain the desired water-repellent and self-cleaning properties are of particular interest.

EP 1 475 426 discloses that surfaces can be modified in the desired manner by spray-application of a dispersion of hydrophobic particles in a solution of a silicon wax in a volatile siloxane onto the surface. Hydrophobized silicas can be used as the hydrophobic particles. A disadvantage of the process disclosed in EP 1 475 426 is that silica-containing aerosols can be produced during the spray-application, and the surface modified by the hydrophobic particles does not exhibit adequate adhesion of the hydrophobic particles to the surface until several hours after spray-application of the dispersion.

WO 2007/053266 describes a modification of surfaces through spray-application of a dispersion of hydrophobized silica in a volatile solvent, where the hydrophobized silica is produced through particle comminution in the presence of a silazane. The dispersions described in WO 2007/053266 are nonaqueous and, in the embodiments specifically disclosed, comprise decamethylcyclopentasiloxane as volatile solvent.

WO 2005/104851 describes aqueous dispersions which comprise from 0.5 to 20% by weight of hydrophobic silica, from 0.01 to 10% by weight of a gelling or viscosity-increasing additive, and from 0.1 to 1% by weight of preservative. The viscosity-increasing additive can be a neutralized carboxy vinyl polymer. WO 2005/104851 also describes the spray-application of the dispersion to a surface with the aim of achieving an insecticidal effect on the surface.

The dispersions known from the prior art have to be applied by spraying onto the surface requiring modification. Attempts to apply the dispersions known from the prior art to a surface by wiping or spreading were unsatisfactory since the result was only nonuniform modification of the surface, and the water-repellent and self-cleaning properties of the modified surface were unsatisfactory.

There is therefore a need for dispersions which can be used for effective modification of surfaces with hydrophobized silica, without production of silica-containing dusts or aerosols during application to the surface.

Surprisingly, it has now been found that uniform modification of surfaces with hydrophobized silica can be achieved through droplet-free application processes, such as wiping, spreading, rolling, or dipping, with dispersions comprising a hydrophobized silica, an alcohol from the group of ethanol, 1-propanol, and 2-propanol, water and a neutralized carboxy vinyl polymer, in suitable proportions, so that the surface obtains water-repellent and optionally also self-cleaning properties.

The invention therefore provides dispersions for the modification of a surface with hydrophobized silica, comprising from 0.1 to 25% by weight of hydrophobized silica, from 8 to 90% by weight of at least one alcohol selected from ethanol, 1-propanol, and 2-propanol, from 7 to 89% by weight of water, from 0 to 30% by weight of solvent not miscible with water, and from 0.04 to 5% by weight of at least one carboxy vinyl polymer, where the carboxy vinyl polymer is present in neutralized form.

The invention also provides a process for the modification of a surface with hydrophobized silica, by applying a dispersion of the invention to the surface by a droplet-free application process, and also processes for the production of the dispersion of the invention.

The dispersion of the invention comprises from 0.1 to 25% by weight of hydrophobized silica, from 8 to 90% by weight of at least one alcohol selected from ethanol, 1-propanol, and 2-propanol, from 7 to 89% by weight of water, from 0 to 30% by weight of solvent not miscible with water, and from 0.04 to 5% by weight of at least one carboxy vinyl polymer which is present in neutralized form. The weight data for the carboxy vinyl polymer are based here on the amount of carboxy vinyl polymer prior to neutralization.

The dispersion of the invention preferably comprises from 0.5 to 10% by weight of hydrophobized silica, particularly preferably from 0.5 to 1.5% by weight. The dispersion of the invention preferably comprises from 10 to 88% by weight of alcohol, particularly preferably from 20 to 88% by weight. The dispersion of the invention preferably comprises from 10 to 89% by weight of water, particularly preferably from 10 to 79% by weight. The dispersion of the invention preferably comprises from 0 to 10% by weight of solvent not miscible with water. The dispersion of the invention preferably comprises from 0.1 to 5% by weight of carboxyl vinyl polymer, particularly preferably from 0.1 to 0.2% by weight. The viscosity of the dispersion of the invention at 20° C. is preferably in the range from 3 to 10 000 mPa*s, particularly preferably in the range from 5 to 1000 mPa*s.

In the invention, the term dispersion denotes a mixture in which the hydrophobized silica is present dispersed in a liquid phase comprising the alcohol and the water. The dispersion of the invention preferably comprises only one liquid phase. Preference is moreover given to dispersions which comprise no other solid in addition to the hydrophobized silica.

The term solvent not miscible with water denotes solvents which are not miscible with, or are not completely miscible with, water, i.e. have a miscibility gap in relation to water.

For the purposes of the invention, hydrophobized silicas are silicas which have covalently bonded organic moieties at their surface and are not wetted by water. Hydrophobized silicas can be produced by reacting silicas with organosilanes, silazanes, or polysiloxanes. Suitable silicon compounds for producing hydrophobized silicas are known from EP-A 0 722 992, page 3, line 9 to page 6, line 6. Particular preference is given to hydrophobized silicas which have been produced by reaction of a silica with a silicon compound from the classes (a) to (e) and (k) to (m) of compounds cited in EP-A 0 722 992.

The hydrophobized silica is preferably a hydrophobized fumed silica which has been produced through hydrophobization of a fumed silica. Fumed silicas are silicas which have been produced by flame hydrolysis of a volatile silicon compound. This flame hydrolysis forms dendritic particles within which primary particles of size less than 50 nm have been sintered to one another. When hydrophobized fumed silica is used, the surfaces modified with the dispersion of the invention exhibit improved self-cleaning effect.

The methanol wettability of the hydrophobized silica is preferably at least 40. Methanol wettability is a measure of the hydrophobicity of the silica, and is determined as the methanol content of a methanol-water mixture in percent by volume which causes sedimentation of 50% of the hydrophobized silica introduced into the methanol-water mixture. At lower methanol content no wetting occurs, and most of the hydrophobized silica floats. At higher methanol content substantial wetting takes place, causing sedimentation of most of the hydrophobized silica. When hydrophobized silica with a methanol wettability of at least 40 is used, the surfaces modified with the dispersion of the invention exhibit improved self-cleaning effect.

Suitable materials for producing the dispersions of the invention are the following hydrophobized fumed silicas supplied by Evonik Degussa: Aerosil® R805, Aerosil® R974, Aerosil® R202, Aerosil® R812, Aerosil® R812S, and Aerosil® R8200, in particular Aerosil® R812S.

It is preferable that the median value of the particle size distribution of the hydrophobized silica, based on weight, is in the range from 50 to 800 nm, particularly preferably from 50 to 200 nm. Particular preference is given to hydrophobized silicas in which less than 5% by weight and in particular less than 1% by weight of the particles are larger than 200 nm. When hydrophobized silicas with such particle sizes are used, the surfaces modified with the dispersion of the invention exhibit only minimal or indeed no alteration of color and of gloss, whereas when hydrophobized silicas with larger particles are used the modified surface appears matt and has whitish discoloration.

Particular preference is given to hydrophobized silicas which have been produced via comminution of particles of a hydrophobized silica in a suspension comprising at least one alcohol selected from ethanol, 1-propanol, and 2-propanol, and at least one silazane of formula (I) or (II)

$(R^1R^2R^3Si)_2NR^4$ (I)

$cyclo(R^1R^2SiNR^4)_m$, (II)

in which formulae (I) or (II) the moieties $R^1$, $R^2$, and $R^3$, independently of one another are hydrocarbon moieties having from 1 to 12 carbon atoms, the moiety $R^4$ is hydrogen or methyl, and m is from 3 to 8. The silazane used preferably is hexamethyldisilazane of the formula (I) where $R^1$, $R^2$, and $R^3$ are methyl and $R^4$ is hydrogen. Preferably a hydrophobized fumed silica is here deagglomerated, i.e. agglomerates of the primary particles of the fumed silica are comminuted. The comminution of the particles can be achieved either by grinding, for example in a ball mill, or through shear forces, for example in a disperser using a toothed disc or a rotor-stator unit. The comminution of the particles is preferably achieved in a liquid jet mill in which jets of the suspension are collided with a velocity which is preferably more than 300 m/s, particularly preferably from 400 to 1000 m/s, and in particular from 600 to 900 m/s. This can be achieved by first using a disperser to comminute the suspension of the particles and then passing the resultant suspension with a pressure in the range from 50 to 500 MPa through at least two circular or slot-shaped nozzles with diameter or, respectively, gap width in the range from 0.05 to 1 mm, preferably from 0.1 to 0.5 mm, the nozzles being directed to the same collision point. A liquid jet mill suitable for this purpose is known from WO 2005/063369. The particles are preferably comminuted in a suspension which comprises no water, particularly preferably in a suspension which comprises no other solvent in addition to the alcohols mentioned. When hydrophobized silicas produced by this type of comminution of particles with addition of a silazane are used, the surfaces modified with the dispersion of the invention exhibit only minimal, or indeed no, alteration of color and of gloss, and at the same time exhibit a high level of self-cleaning effect. Compared to the comminution in decamethylcyclopentasiloxane known from WO 2007/053266, the comminution of the hydrophobized silica in an alcohol from the group of ethanol, 1-propanol and 2-propanol gives a dispersion with a smaller proportion of large particles with a particle size of more than 200 nm, while simultaneously reducing energy consumption for the comminution of the particles. Comminution of a hydrophobized fumed silica in a liquid jet mill in which jets of a suspension of the silica are collided can reduce the proportion of particles of size more than 200 nm to less than 1% by weight.

For the purposes of the invention, carboxy vinyl polymers are polymers which are obtainable through polymerization of vinyl monomers and which comprise carboxylic acid groups. For the purposes of the invention, carboxy vinyl polymers in neutralized form are carboxy vinyl polymers in which more than 50%, preferably more than 80%, of the carboxylic acid groups have been neutralized by deprotonation. The amount of carboxylic acid groups that have been neutralized in the neutralized carboxy vinyl polymer is preferably such that the pH of an aqueous solution of the neutralized carboxy vinyl polymer is in the range from 6 to 11.

The carboxy vinyl polymer has preferably been neutralized with an alkanolamine, particularly preferably with tetrahydroxypropylethylenediamine. Carboxy vinyl polymers thus neutralized exhibit high solubility and good thickening effect in the dispersion of the invention, even when water content is low, and give the dispersion of the invention improved shelf life and processability.

In a preferred embodiment, the carboxy vinyl polymer is a copolymer which comprises, as monomer units, on the one hand acrylic acid, methacrylic acid, or a mixture of the two, and on the other hand at least one ester of acrylic acid, of methacrylic acid, or of a mixture of the two, with an alcohol having from 1 to 4 carbon atoms. Carboxy vinyl polymers of this type act as nonassociative thickeners and are obtainable by way of example as Aculyn® 33 from Rohm and Haas. Dispersions with said polymers have high shelf life and good processability, while at the same time giving surfaces treated with the dispersion good self-cleaning properties.

In another preferred embodiment, the carboxy vinyl polymer is a crosslinked copolymer which comprises, as monomer units, on the one hand acrylic acid, methacrylic acid, or a mixture of the two, and on the other hand at least one ester of acrylic acid, of methacrylic acid, or of a mixture of the two, with an alcohol having from 10 to 30 carbon atoms. Carboxy vinyl polymers of this type act as associative thickeners and are obtainable by way of example as TEGO® Carbomer 341 ER from Evonik Goldschmidt. The said polymers can achieve high shelf life, good processability, and good self-cleaning properties of surfaces treated with the dispersion, even at lower contents of the polymer in the dispersion.

The dispersions of the invention comprise an amount of from 8 to 90% by weight of an alcohol selected from ethanol, 1-propanol, and 2-propanol and mixtures thereof, as well as an amount of from 7 to 89% by weight of water. If the proportion of alcohol in the dispersion is below 8% by weight, the dispersion loses shelf life, and surfaces modified with a dispersion of this type exhibit substantially poorer self-cleaning effect and, even when small silica particles are used, appear matt with whitish discoloration. If the proportion of water in the dispersion is below 7% by weight, surfaces modified with a dispersion of this type exhibit markedly poorer self-cleaning effect, and the carboxy vinyl polymer can precipitate in the dispersion.

The dispersions of the invention comprise an amount of from 0.1 to 25% by weight of hydrophobized silica and an amount of from 0.04 to 5% by weight of at least one neutralized carboxy vinyl polymer. If contents of hydrophobized silica or of neutralized carboxy vinyl polymer are smaller, surfaces modified with a dispersion of this type no longer exhibit adequate self-cleaning effect. If contents of hydrophobized silica or of neutralized carboxy vinyl polymer are higher, the viscosity of the dispersion becomes so high that it becomes difficult to distribute on a surface.

The dispersions of the invention can comprise up to 30% by weight of solvents not miscible with water. Suitable solvents not miscible with water here are aliphatic, olefinic, and aromatic hydrocarbons, ethers, esters, ketones, acetals, alcohols, and polydimethylsiloxanes. Examples of suitable aliphatic hydrocarbons are pentane, hexane, heptane, octane, isooctane, and the hydrocarbon mixtures known as petroleum ethers. It is preferable to use low-odor aliphatic hydrocarbon mixtures available under the trademarks ShellSol® T and ShellSol® D. It is preferable to use solvents which are not miscible with water and which have an evaporation rate of less than 100 according to DIN 53170. The amount of solvents not miscible with water is preferably selected in such a way that the dispersion comprises only one liquid phase. At contents of more than 30% by weight of solvents not miscible with water, the dispersions obtained have two liquid phases and low viscosity, and cannot be applied uniformly to surfaces.

In a preferred embodiment, the dispersion of the invention additionally comprises, as adhesion promoter, a polysiloxane of formula (III) or (IV)

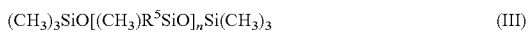

(III)

(IV)

where the moieties $R^5$ in the formulae (III) and (IV), randomly distributed, are either methyl groups or hydrocarbon moieties having from 6 to 24 carbon atoms, where at least one of the moieties $R^5$ is not methyl, n is from 1 to 100, and p is from 3 to 100. In this embodiment, the dispersion comprises no more than 30% by weight of water. The molar mass of the polysiloxane is preferably less than 10 000 g/mol, particularly preferably less than 1000 g/mol. Use of an adhesion promoter of this type achieves better adhesion of the hydrophobized silica on the surface when a surface is modified with the dispersion, with the result that the water-repellent and self-cleaning property of the surface lasts longer and that the surface can be subjected to greater mechanical stress without loosing its water-repellent and self-cleaning properties.

The dispersion of the invention can optionally also comprise further components, for example fragrances and dyes. If the amount of alcohol present in a dispersion of the invention is not by itself sufficient to preserve the dispersion and to suppress bacterial growth, the dispersion can also comprise preservatives, for example 2-methyl-4-isothiazolin-3-one, 1,2-benzisothiazolin-3-one, or 2-nitropropane-1,3-diol.

In principle, all solid surfaces can be modified with the dispersions of the invention.

The dispersions of the invention are suitable for the modification of hard, essentially pore-free surfaces, such as glass, glazed ceramic, metal, plastics, and coated surfaces. Surfaces of this type have water-repellent and self-cleaning properties after modification with a dispersion of the invention. When the dispersion used for modification has particles with a median of the particle size distribution in the range from 50 to 200 nm, the modified surfaces exhibit only minimal, or indeed no, alteration of gloss and color, i.e. the modification of the surface is invisible. The best combination of self-cleaning properties with minimal alteration of appearance of the modified surface is achieved with dispersions comprising a hydrophobized fumed silica with a median of the particle size distribution in the range from 50 to 120 nm and less than 2% by weight of particles with a size of more than 200 nm.

The dispersions of the invention are also suitable for the modification of hard, porous surfaces, such as stone, concrete, unglazed ceramic, or wood. Surfaces of this type also have reduced water absorption after modification with a dispersion of the invention, since water droplets run off the surface and do not come into direct contact with the surface, and the water is therefore not absorbed into the pores by the action of capillary forces. An advantage of the dispersions of the invention over the dispersions known from the prior art here is that when used on porous surfaces they do not lead to prolonged discoloration of the modified surface.

However, the dispersions of the invention can also be used just as well for the modification of flexible surfaces, such as leather, paper, or textiles.

Depending on the amount of hydrophobized silica applied to the surface, the dispersions of the invention can also be used to achieve, in addition to the water-repellent and self-cleaning effect, further effects such as the insecticidal and acaricidal effect known from WO 2005/104851.

In comparison with the dispersions known from WO 2007/053266, another advantage of the dispersions of the invention is that the dispersion does not need to comprise any water-binding reactive solvent in order to permit application of the dispersions to moist surfaces. The dispersions of the invention can therefore be used for the modification of a surface immediately after water has been used to clean the surface, without any need to wait for drying of the surface.

An advantage of the dispersions of the invention in comparison with the dispersions known from the prior art is that they do not have to be applied to a surface by spraying in order to give the surface a self-cleaning effect, but, even when applied to a surface by a droplet-free application process, modify the surface in such a way that it obtains water-repellent and self-cleaning properties.

The invention therefore also provides a process for the modification of a surface with hydrophobized silica, where a dispersion of the invention is applied to the surface by a droplet-free application process. It is preferable that the dispersion is applied to the surface by wiping with a cloth or sponge, by spreading with a paintbrush or other brush, or by rolling with an applicator roll. As an alternative, the dispersion can also be applied to the surface by immersing the surface in the dispersion and permitting excess dispersion to run off from the surface.

An advantage of the process of the invention for the modification of a surface in comparison with the processes known from the prior art is that no silica-containing dusts or aerosols can arise during the modification of the surface, with the result that, even when hydrophobized silicas with small particle sizes are used, there is no need for additional protective measures during processing in order to prevent the particles from entering the lungs.

The dispersions of the invention, and the process of the invention for the modification of a surface, can modify surfaces with hydrophobized silica in such a way that the particles of the hydrophobized silica adhere on the surface and are not released, or are released only to minimal extent, by wind, or rain, or by water running across the surface. The modification of the surface is therefore weathering-resistant and resistant to rinsing with water. An advantage of the dispersions of the invention in comparison with the dispersions known from EP 1 475 426 and WO 2007/053266 here is that strong adhesion of the particles on the surface, with resultant weather resistance, is achieved even after a relatively short time, generally within a few minutes after application of the dispersion to the surface.

However, the particles of hydrophobized silica can be released mechanically from the surface, e.g. by rubbing or by a high-pressure water jet, or by aqueous surfactant solutions. The dispersions of the invention, and the process of the invention for the modification of a surface, therefore permit repeated cleaning of, and repeated provision of water-repellent and self-cleaning properties to a surface, without any resultant accumulation of substances on the surface over the course of time.

The dispersions of the invention, and the process of the invention for the modification of a surface, are particularly suitable for the treatment of vehicle varnishes and vehicle parts with the aim of avoiding recurrence of soiling after a wash, and of using the action of rain to clean the surface. They are also equally suitable for the treatment of roofs, solar cells, facades of buildings, and external sides of windows. When the surface of solar cells is treated, losses in efficiency due to soiling of the surface of the solar cells are also avoided.

The dispersions of the invention, and the process of the invention for the modification of a surface, are moreover suitable for keeping surfaces hygienic after cleaning, since the water-repellent effect inhibits wetting of the modified surface with water and thus prevents or delays reproduction of bacteria or mold on the surface.

The dispersions of the invention are preferably produced by a process where, in a first step, particles of a hydrophobized silica are comminuted in a suspension which comprises at least one alcohol selected from ethanol, 1-propanol, and 2-propanol, and which comprises at least one silazane of the formula (I) or (II) defined above, until the median value of the particle size distribution is in the range from 50 to 800 nm, preferably from 50 to 200 nm. The comminution of the particles can be achieved either by grinding, for example in a ball mill, or else through shear forces, for example in a disperser using a toothed disc or a rotor-stator unit. The comminution of the particles is preferably achieved in a liquid jet mill in which jets of the suspension are collided with a velocity which is preferably more than 300 m/s, particularly preferably from 400 to 1000 m/s, and in particular from 600 to 900 m/s. This can be achieved by first using a disperser to comminute the suspension of the particles and then passing the resultant suspension with a pressure in the range from 50 to 500 MPa through at least two circular or slot-shaped nozzles with diameter or, respectively, gap width in the range from 0.05 to 1 mm, preferably from 0.1 to 0.5 mm, these nozzles being directed to the same collision point. The particles are preferably comminuted in a suspension which comprises no water, particularly preferably in a suspension which comprises no other solvent in addition to the alcohols mentioned. It is particularly preferable that a hydrophobized fumed silica is deagglomerated, i.e. that the agglomerates of the primary particles of the fumed silica are comminuted. The content of hydrophobized silica in the suspension when the particles of hydrophobized silica are comminuted is preferably in the range from 5 to 30% by weight. By selecting such a content, particularly small particles can be obtained, even with low energy input.

For production of dispersions of the invention comprising more than 40% by weight of water, the suspension obtained in the first step is then added to an aqueous solution of a neutralized carboxy vinyl polymer. The aqueous solution of the neutralized carboxy vinyl polymer can comprise one of the alcohols used in the first step.

In contrast, the production of dispersions of the invention comprising less than 40% by weight of water preferably uses the further steps of preparation of a concentrated aqueous solution of a neutralized carboxy vinyl polymer, addition of the resultant solution to a medium which comprises more than 60% by weight of at least one alcohol from the group of ethanol, 1-propanol, and 2-propanol, and addition of the suspension from the first step to the resultant mixture.

The aqueous solution of the neutralized carboxy vinyl polymer is preferably produced by admixing neutralizing agent with an aqueous dispersion of the carboxy vinyl polymer and stirring until the pH of the dispersion is in the range from 7 to 9 and the carboxy vinyl polymer has dissolved.

The dispersions produced by the process of the invention have high dispersion stability and, after application to a surface, give a particularly high level of water-repellent and self-cleaning effect.

The examples below illustrate the invention, but without restricting its subject matter.

EXAMPLES

Comminution of Hydrophobized Silica in the Presence of Hexamethyldisilazane

Example 1 (not of the Invention)

A dispersion of Aerosil® R 812 S hydrophobized fumed silica in decamethylcyclopentasiloxane was produced as described in example Q in paragraphs [0179] and [0181] in WO 2007/053266. The median value of the particle size distribution was 190 nm, determined by laser scattering using Horiba LA-910 equipment. The proportion of particles with particle size of more than 200 nm was 45% by weight.

Example 2 (not of the Invention)

Example 1 was repeated as described in example Y in paragraphs [0182] and [0183] in WO 2007/053266.

Example 3

200 g of Aerosil® R 812 S hydrophobized fumed silica was added, with stirring to a solution of 2 g of hexamethyldisilazane in 798 g of ethanol, and dispersed for 15 minutes at 2200 min$^{-1}$ with a Dissolver Dispermat® from VMA-Getzmann GmbH, using a toothed disc of diameter 70 mm. The resultant suspension was then milled in a liquid jet mill using a jet velocity of 700 m/s, where the liquid jet mill had three nozzles arranged in a plane at angles of 120° and directed at the same collision point. The median value of the particle size distribution was then 84 nm, determined by laser scattering using Horiba LA-910 equipment. No particles of diameter larger than 200 nm were found.

Example 4

The suspension obtained in example 3 was diluted with a further 332 g of ethanol.

Production of a Concentrated Aqueous Solution of a Neutralized Carboxy Vinyl Polymer Example 5

10 g of the carboxy vinyl polymer TEGO® Carbomer 341 ER were slowly dispersed with stirring into 365 g of water and uniformly suspended. After stirring for 30 min, a mixture of 12.5 g of tetrahydroxypropylethylenediamine and 112.5 g of ethanol was added, with stirring, whereupon a clear viscous solution formed with pH 7.

Dispersions for the Modification of a Surface

Example 6 (not of the Invention)

10 parts by weight of the dispersion obtained in example 1 were mixed with 90 parts by weight of decamethylcyclopentasiloxane as described for Treatment Composition example 15 in paragraph [0188] in WO 2007/053266. A low-viscosity dispersion was obtained, from which some of the dispersed silica settled during storage.

Example 7 (not of the Invention)

10 parts by weight of the dispersion obtained in example 2 were mixed with 90 parts by weight of decamethylcyclopentasiloxane as described for Treatment Composition example 13 in paragraph [0188] in WO 2007/053266. A low-viscosity dispersion was obtained, from which some of the dispersed silica settled during storage.

Example 8

2.5 g of the solution from example 5 were added, with stirring, to a mixture of 86.5 g of water and 1.0 g of ethanol. 10.0 g of the suspension from example 4 were admixed with the resultant clear viscous solution, with stirring. A viscous dispersion was obtained, from which no material settled during storage.

Example 9 (not of the Invention)

1.5 g of the solution from example 5 were added, with stirring, to a mixture of 87.5 g of water and 1.0 g of ethanol. 10.0 g of the suspension from example 4 were admixed with the resultant clear viscous solution, with stirring. A dispersion was obtained, from which part of the hydrophobized silica settled during storage.

Example 10

2.5 g of the solution from example 5 were added, with stirring, to a mixture of 77.6 g of water and 16.5 g of ethanol. 3.4 g of the suspension from example 4 were admixed with the resultant clear viscous solution, with stirring. A viscous dispersion was obtained, from which no material settled during storage.

Example 11

5.0 g of the solution from example 5 were added, with stirring, to a mixture of 75.0 g of water and 16.6 g of ethanol. 3.4 g of the suspension from example 4 were admixed with the resultant clear viscous solution, with stirring. A viscous dispersion was obtained, from which no material settled during storage.

Example 12

5.0 g of the solution from example 5 were added, with stirring, to a mixture of 45.0 g of water and 42.5 g of ethanol. 7.5 g of the suspension from example 4 were admixed with the resultant clear viscous solution, with stirring. A viscous dispersion was obtained, from which no material settled during storage.

Example 13

5.0 g of the solution from example 5 were added, with stirring, to a mixture of 7.5 g of water, 82.15 g of ethanol, and 0.35 g of TEGOPREN® 6801 cetyl methicone. 5.0 g of the suspension from example 4 were admixed with the resultant clear viscous solution, with stirring. A viscous dispersion was obtained, from which no material settled during storage.

Example 14 (not of the Invention)

5.0 g of the solution from example 5 were added, with stirring, to a mixture of 2.5 g of water, 87.15 g of ethanol, and 0.35 g of TEGOPREN® 6801 cetyl methicone. 5.0 g of the suspension from example 4 were admixed with the resultant mixture, with stirring. A low-viscosity dispersion was obtained, from which solid settled during storage.

Example 15

5.0 g of the solution from example 5 were added, with stirring, to a mixture of 25.0 g of water, 64.65 g of ethanol, and 0.35 g of TEGOPREN® 6801 cetyl methicone. 5.0 g of the suspension from example 3 were admixed with the resultant clear viscous solution, with stirring. A viscous dispersion was obtained, from which no material settled during storage.

Example 16

10.0 g of the solution from example 5 were added, with stirring, to a mixture of 6.5 g of water, 66.5 g of ethanol, 10.0 g of decamethylcyclopentasiloxane, and 0.35 g of TEGOPREN® 6801 cetyl methicone. 6.65 g of the suspension from example 4 were admixed with the resultant clear viscous solution, with stirring. A viscous dispersion was obtained, from which no material settled during storage.

Example 17

10.0 g of the solution from example 5 were added, with stirring, to a mixture of 4.25 g of water, 72.0 g of ethanol, 10.0 g of decamethylcyclopentasiloxane, and 0.35 g of TEGOPREN® 6801 cetyl methicone. 3.4 g of the suspension from example 4 were admixed with the resultant clear viscous solution, with stirring. A viscous dispersion was obtained, from which no material settled during storage.

Example 18

7.5 g of the solution from example 5 were added, with stirring, to a mixture of 6.75 g of water, 76.0 g of ethanol, 6.0 g of ShellSol® D60 mineral oil, and 0.35 g of TEGOPREN® 6801 cetyl methicone. 3.4 g of the suspension from example 4 were admixed with the resultant clear viscous solution, with stirring. A viscous dispersion was obtained, from which no material settled during storage.

Example 19 (not of the Invention)

10.0 g of the solution from example 5 were added, with stirring, to a mixture of 30.0 g of water, 9.65 g of ethanol, 40.0 g of decamethylcyclopentasiloxane, and 0.35 g of TEGOPREN® 6801 cetyl methicone. 10.0 g of the suspension from example 4 were admixed with the resultant mixture, with stirring. A low-viscosity dispersion with two liquid phases was obtained.

Table 1 summarizes the proportions of Aerosil® R 812 S hydrophobized silica, ethanol, water, solvents not miscible with water, TEGO® Carbomer 341 ER carboxy vinyl polymer, and TEGOPREN® 6801 adhesion promoter in the dispersions of examples 6 to 19.

TABLE 1

Proportions in % by weight in the dispersions

| Example | Aerosil ® R 812 S | Ethanol | Water | LM** | TEGO ® Carbomer 341 ER | TEGOPREN ® 6801 |
|---|---|---|---|---|---|---|
| 6* | 0.5 | | | | 99.4 | |
| 7* | 0.5 | | | | 99.5 | |
| 8 | 1.5 | 10.0 | 88.3 | | 0.05 | |
| 9* | 1.5 | 9.8 | 88.6 | | 0.03 | |
| 10 | 0.51 | 19.9 | 79.4 | | 0.05 | |
| 11 | 0.51 | 20.6 | 78.7 | | 0.1 | |
| 12 | 1.13 | 50.0 | 48.7 | | 0.1 | |
| 13 | 0.75 | 87.5 | 11.2 | | 0.1 | 0.35 |
| 14* | 0.75 | 92.5 | 6.2 | | 0.1 | 0.35 |
| 15 | 1.0 | 69.8 | 28.7 | | 0.1 | 0.35 |
| 16 | 1.0 | 74.4 | 13.8 | 10.0 | 0.2 | 0.35 |
| 17 | 0.51 | 77.1 | 11.6 | 10.0 | 0.2 | 0.35 |
| 18 | 0.51 | 80.6 | 12.2 | 6.0 | 0.15 | 0.35 |
| 19* | 1.5 | 20.4 | 37.3 | 40.0 | 0.2 | 0.35 |

*not of the invention
**LM = Decamethylcyclopentasiloxane, except for example 18 where LM = ShellSol ® D60

Modification of Surfaces with Silica Dispersions

In all of the experiments, a paintbrush of width 2 cm with synthetic bristles was used to apply the dispersions to the surface. In each case the amount applied was about 100 g/m². The treated surfaces were placed vertically for drying. The drying time was determined visually as the point in time from which the drying surface no longer appeared moist. The appearance of the treated surface was assessed after the drying time. The contact angle of water droplets on the surface was determined optically, using OCA35 contact angle measurement equipment from DataPhysics Instruments GmbH, with water droplets of volume 50 µl on a horizontal surface. Run-off of water from the surface was determined by applying water droplets of volume 50 µl to the horizontal surface, then inclining the surface at an angle of 45° and assessing the run-off of the water droplets visually by the criteria of table 2. The durability of the modification was determined by pouring water in portions of 2 l from a measuring cylinder across a treated surface inclined at an angle of 45° until water droplets remained adhering on the surface with an angle of contact of less than 90°.

TABLE 2

Evaluation of run-off of water droplets from an untreated surface

| Visually observed run-off behavior | Evaluation |
|---|---|
| All of the water droplets run off | 1 |
| Water droplets run off and only occasionally adhere to the surface | 2 |
| Water droplets run off and adhere to the surface at some locations | 3 |
| Water droplets run off and adhere to the surface at numerous locations | 4 |
| Most water droplets adhere to the surface; only a few roll off | 5 |
| All of the water droplets adhere to the surface | 6 |

Example 20

An untreated planed wood surface was modified with various silica dispersions, and the following were determined: drying time, appearance, contact angle of water droplets, the run-off of water droplets, by the abovementioned methods. Table 3 summarizes the results.

TABLE 3

Modification of a wood surface with silica dispersions

| Silica dispersion | Drying time | Appearance | Contact angle | Run-off of water droplets |
|---|---|---|---|---|
| Example 6* | >3 h | color alteration | <90° | 4 |
| Example 7* | >3 h | color alteration | <90° | 4 |
| Example 8 | 15 min | unaltered | >140° | 3 |
| Example 13 | 15 min | unaltered | >140° | 2 |
| Example 15 | 15 min | unaltered | >140° | 2 |
| Example 16 | 10 min | unaltered | >140° | 2 |

*not of the invention

Example 21

An untreated sandstone surface was modified with various silica dispersions, and the following were determined: drying time, appearance, contact angle of water droplets, the run-off of water droplets, by the abovementioned methods. Table 4 summarizes the results.

TABLE 4

Modification of a wood surface with silica dispersions

| Silica dispersion | Drying time | Appearance | Contact angle | Run-off of water droplets |
|---|---|---|---|---|
| Example 6* | >3 h | color alteration | <90° | 4 |
| Example 7* | >3 h | color alteration | <90° | 4 |
| Example 8 | 15 min | unaltered | >140° | 5 |
| Example 13 | 15 min | unaltered | >140° | 2 |
| Example 15 | 15 min | unaltered | >140° | 2 |
| Example 16 | 10 min | unaltered | >140° | 2 |

*not of the invention

Example 22

A wood surface coated with plastics sheeting was modified with various silica dispersions, and the following were determined: drying time, contact angle of water droplets, the durability of the modification, by the abovementioned methods. Table 5 summarizes the results.

TABLE 5

Modification, with silica dispersions, of a wood surface coated with plastics sheeting

| Silica dispersion | Drying time | Contact angle | Durability |
|---|---|---|---|
| Example 6* | >3 h | >140° | 6 l |
| Example 7* |  |  | 2 l |
| Example 15 | 15 min | >140° | 20 l |

*not of the invention

Example 23

A glass surface was modified with various silica dispersions, and the following were determined: drying time, appearance, contact angle of water droplets, the durability of the modification, by the abovementioned methods. Table 6 summarizes the results.

TABLE 6

Modification of a glass surface with silica dispersions

| Silica dispersion | Drying time | Appearance | Contact angle | Durability |
|---|---|---|---|---|
| Example 6* | >3 h | Nonuniform whitish | >140° | 2 l |
| Example 16 | 30 min | hardly visible whitish | >140° | >40 l |

*not of the invention

Examples 20 and 21 show that, unlike the dispersions known from WO 2007/053266, the dispersions of the invention can achieve water-repellent modification of the surface even on porous, absorbent surfaces, through application of the dispersion by a paintbrush, without any substantial alteration to the appearance of the surface.

Examples 22 and 23 show that, unlike the dispersions known from WO 2007/053266, the dispersions of the invention dry relatively quickly and relatively uniformly on nonporous surfaces and provide relatively durable modification.

Example 24 (not of the Invention)

A mixture of 15% by weight of Aerosil® R 812 S hydrophobized fumed silica, 82% by weight of decamethylcyclopentasiloxane, and 3% by weight of hexamethyldisilazane was milled twice as described in example 3 in a liquid jet mill. The median value of the particle size distribution, determined by laser scattering using Horiba LA-910 equipment, was 286 nm after the first milling process and 132 nm after the second milling process. The proportion of particles with a particle size of more than 200 nm was 93% by weight after the first milling process and 6% by weight after the second milling process. The dispersion obtained was mixed with 2 parts by weight of decamethylcyclopentasiloxane. A low-viscosity dispersion was obtained, from which part of the dispersed silica settled during storage. The example shows that the dispersions in decamethylcyclopentasiloxane known from WO 2007/053266 have poor shelf life even when a liquid jet mill is used for the dispersion process.

What is claimed is:

1. A dispersion for modifying a surface with hydrophobized silica, comprising, based on the weight of the dispersion:
   a) from 0.1 to 25% by weight of hydrophobized deagglomerated silica, wherein the hydrophobized deagglomerated silica in the dispersion has been prepared by comminution of particles of hydrophobized silica in a suspension comprising at least one alcohol selected from the group consisting of: ethanol; 1-propanol; and 2-propanol; and at least one silazane of formula (I) or (II):

$(R^1R^2R^3Si)_2NR^4$      (I)

$cyclo(R^1R^2SiNR^4)_m$,      (II)

in which:
   the moieties $R^1$, $R^2$, and $R^3$, independently of one another, are hydrocarbon moieties having from 1 to 12 carbon atoms;
   the moiety $R^4$ is hydrogen or methyl; and
   m is from 3 to 8;
   b) from 8 to 90% by weight of at least one alcohol selected from the group consisting of: ethanol; 1-propanol; and 2-propanol;
   c) from 7 to 89% by weight of water;
   d) from 0 to 30% by weight of solvents not miscible with water; and
   e) from 0.1-0.2% by weight of at least one carboxy vinyl polymer, wherein said carboxy vinyl polymer is present in neutralized form.

2. The dispersion of claim 1, wherein said hydrophobized silica has a median value of particle size distribution, based on weight, in the range of from 50 to 800 nm.

3. The dispersion of claim 2, wherein said median value is from 50 to 200 nm.

4. The dispersion of claim 1, wherein the carboxy vinyl polymer has been neutralized by an alkanolamine.

5. The dispersion of claim 1, wherein the carboxy vinyl polymer is a copolymer comprising, as monomer units:
   a) acrylic acid, methacrylic acid or a mixture thereof, and
   b) an ester of acrylic acid, methacrylic acid or a mixture thereof with an alcohol having from 1 to 4 carbon atoms.

6. The dispersion of claim 1, wherein the carboxy vinyl polymer is a crosslinked copolymer comprising, as monomer units:
   a) acrylic acid, methacrylic acid or a mixture thereof, and
   b) an ester of acrylic acid, methacrylic acid or a mixture thereof, with an alcohol having from 10 to 30 carbon atoms.

7. The dispersion of claim 1, comprising up to 30% by weight of water and additionally, as adhesion promoter, a polysiloxane of formula (III) or (IV):

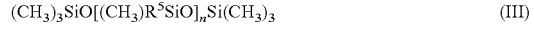

$(CH_3)_3SiO[(CH_3)R^5SiO]_nSi(CH_3)_3$      (III)

$cyclo[(CH_3)R^5SiO]_p$,      (IV)

in which:
   the moieties $R^5$, randomly distributed, are either methyl groups or hydrocarbon moieties having from 6 to 24 carbon atoms, and wherein at least one of the moieties $R^5$ is not methyl;
   n is from 1 to 100; and
   p is from 3 to 100.

8. The dispersion of claim 7, wherein the polysiloxane has an average molar mass of less than 10 000 g/mol.

9. A method of modifying a surface with hydrophobized silica, wherein a dispersion as claimed in claim 1 is applied to said surface by a droplet-free application process.

10. The method of claim 9, wherein the dispersion is applied to the surface by wiping with a cloth or sponge, by spreading with a paintbrush or other brush, or by rolling with an applicator roll.

11. The method of claim 9, wherein the surface is immersed in the dispersion and excess dispersion is permitted to run off.

12. A process for making a dispersion as claimed in claim 1, comprising:
   a) comminuting particles of a hydrophobized silica to a median value of the particle size distribution in the range from 50 to 800 nm, in a suspension comprising at least one alcohol selected from the group consisting of: ethanol; 1-propanol; and 2-propanol; and at least one silazane of formula (I) or (II):

$(R^1R^2R^3Si)_2NR^4$           (I)

$cyclo(R^1R^2SiNR^4)_m,$           (II)

in which:
   the moieties $R^1$, $R^2$, and $R^3$, independently of one another are hydrocarbon moieties having from 1 to 12 carbon atoms,
   the moiety $R^4$ is hydrogen or methyl, and
   m is from 3 to 8;
   b) preparing a concentrated aqueous solution of a neutralized carboxy vinyl polymer;
   c) adding the solution from step b) to a medium which comprises more than 60% by weight of at least one alcohol selected from the group consisting of ethanol, 1-propanol, and 2-propanol, and
   d) adding the suspension from step a) to the mixture from step c).

13. The process of claim 12 wherein the median value of the particle size distribution range is from 50 to 200 nm.

14. A process for making a dispersion as claimed in claim 1, comprising:
   a) comminuting particles of a hydrophobized silica to a median value of the particle size distribution in the range from 50 to 800 nm, in a suspension comprising at least one alcohol selected from the group consisting of ethanol, 1-propanol and 2-propanol, and at least one silazane of formula (I) or (II):

$(R^1R^2R^3Si)_2NR^4$           (I)

$cyclo(R^1R^2SiNR^4)_m,$           (II)

in which:
   the moieties $R^1$, $R^2$, and $R^3$, independently of one another are hydrocarbon moieties having from 1 to 12 carbon atoms;
   the moiety $R^4$ is hydrogen or methyl; and
   m is from 3 to 8, and
   b) adding the suspension from step a) to an aqueous solution of a neutralized carboxy vinyl polymer.

15. The process of claim 14, wherein the median value of the particle size distribution range is 50 to 200 nm.

16. The dispersion of claim 1, wherein said dispersion comprises 10-79% by weight of water.

17. The dispersion of claim 16, wherein the hydrophobized silica has a median value of particle size distribution, based on weight, in the range of from 50 to 200 nm and more than 80% of the carboxylic acid groups on said carboxy vinyl polymer have been neutralized by deprotonation.

18. The dispersion of claim 1, wherein said dispersion comprises 20-88% by weight of at least one alcohol selected from the group consisting of: ethanol; 1-propanol; and 2-propanol.

19. The dispersion of claim 18, wherein the hydrophobized silica has a median value of particle size distribution, based on weight, in the range of from 50 to 200 nm and more than 80% of the carboxylic acid groups on said carboxy vinyl polymer have been neutralized by deprotonation.

* * * * *